United States Patent [19]

Ikeguchi

[11] 4,373,086

[45] Feb. 8, 1983

[54] CURABLE RESIN COMPOSITION FROM CYANATE ESTER AND ACRYLIC ESTER

[75] Inventor: Nobuyuki Ikeguchi, Tokyo, Japan

[73] Assignee: Mitsubishi Gas Chemical Company, Inc., Tokyo, Japan

[21] Appl. No.: 231,428

[22] Filed: Feb. 3, 1981

[30] Foreign Application Priority Data

Feb. 6, 1980 [JP] Japan .................................. 55/13202

[51] Int. Cl.$^3$ ...................... C08G 73/12; C08G 83/00
[52] U.S. Cl. .................................... 528/322; 525/422;
528/159; 528/163; 528/170; 528/203; 528/321;
528/363
[58] Field of Search ............... 528/363, 322, 321, 159,
528/163, 170, 203; 525/422

[56] References Cited

U.S. PATENT DOCUMENTS

| | | | |
|---|---|---|---|
| 3,448,079 | 6/1969 | Grigat et al. | 260/59 |
| 3,553,244 | 1/1971 | Grigat et al. | 260/453 |
| 3,562,214 | 2/1971 | Kubens et al. | 260/47 |
| 3,740,348 | 6/1973 | Grigat et al. | 260/453 AL |
| 3,755,402 | 8/1973 | Grigat et al. | 260/453 AR |
| 4,110,364 | 8/1978 | Gaku et al. | 528/170 |
| 4,116,946 | 9/1978 | Jakob et al. | 528/363 |

FOREIGN PATENT DOCUMENTS 1060933 3/1967 United Kingdom .

*Primary Examiner*—Harold D. Anderson
*Attorney, Agent, or Firm*—Fleit & Jacobson

[57] ABSTRACT

A curable resin composition comprising a mixture and/or a preliminary reaction product of (a) at least one cyanate compound selected from the group consisting of polyfunctional cyanate esters, prepolymers of said cyanate esters, coprepolymers of said cyanate esters and an amine and mixtures thereof, (b) at least one compound having two or more acrylic ester groups represented by the formula

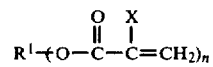

wherein R$^1$ is organic group comprising as member constituting a main chain or ring C and optionally O and/or N and optionally as a pendant hydroxy and/or halogen, when R$^1$ contains aromatic group, R$^1$ has 6–35 carbon atoms, and when R$^1$ contains no benzene ring, R$^1$ has 1–15 carbon atoms, X is hydrogen or methyl, n is integer of 2, 3, 4, 5 or 6 and valency of R$^1$ is the same as n, and optionally (c) at least one compound selected from the group consisting of polyfunctional maleimides, prepolymers of the maleimides or coprepolymers of the maleimides and an amine is disclosed.

10 Claims, No Drawings

CURABLE RESIN COMPOSITION FROM CYANATE ESTER AND ACRYLIC ESTER

BACKGROUND OF THE INVENTION

This invention relates to a curable resin composition comprising a mixture and/or a preliminary reaction product of (a) a polyfunctional cyanate ester, prepolymer of the cyanate ester or coprepolymer of the cyanate ester and an amine (sometimes hereinunder referred to as component (a)) and (b) a compound having two or more acrylic ester groups represented by the formula

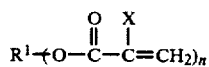

wherein $R^1$ is organic group comprising as a main chain or a member constituting ring C and optionally O and/or N, and as a pendant optionally hydroxy and/or halogen, when $R^1$ is aromatic group, $R^1$ has 6–35 carbon atoms, and when $R^1$ contains no benzene ring, $R^1$ has 1-15 carbon atoms, X is hydrogen or methyl, n is integer of 2,3,4,5 or 6 and valency of $R^1$ is the same as n (sometimes hereinunder referred to as component (b)) and also relates to a curable resin composition comprising a mixture and/or a preliminary reaction product of component (a), component (b) and (c) a polyfunctional maleimide, prepolymer of the maleimide or coprepolymer of the maleimide and an amine (sometimes hereinunder referred to as component (c)). Cured resin obtained by curing each of the resin compositions has excellent impact-resistance, adhesive power, heat-resistance and chemical resistance.

In the prior art, a coating composition comprising a polyfunctional cyanate ester and an acrylic copolymer having two or more hydroxy groups or epoxy groups (Japanese Patent Publication (laid open) No. 11133/1978) and a coating composition comprising a polyfunctional cyanate ester and an acrylic copolymer having free carboxylic group were known.

SUMMARY OF THE INVENTION

The present inventors carried out research for obtaining a cured resin having excellent heat resistance, chemical resistance and mixture resistance. As a result it was found that when a mixture and/or a preliminary reaction product of a polyfunctional cyanate ester compound and a compound having two or more acrylic ester groups and optionally a polyfunctional maleimide compound is cured, the resulting cured resin has the above-mentioned desirable properties. This invention is based on this discovery.

DETAILED DESCRIPTION OF THE INVENTION

By polyfunctional cyanate ester is meant a compound having at least two cyanate groups in its molecule. The polyfunctional cyanate ester is represented by the formula

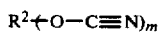

wherein $R^2$ is an aromatic nucleus-containing residue which is selected from the group consisting of a residue derived from an aromatic hydrocarbon selected from the group consisting of benzene, biphenyl and naphthalene, a residue derived from a compound in which at least two benzene rings are bonded to each other by a bridging member selected from the group consisting of

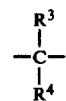

wherein $R^3$ and $R^4$ are the same or different and each represents a hydrogen atom or an alkyl group containing 1 to 4 carbon atoms,

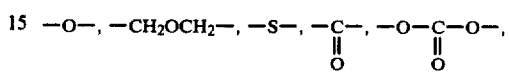

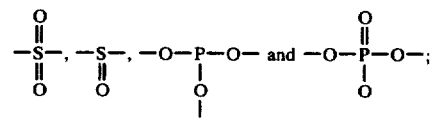

said aromatic nucleus is optionally substituted by a substituent selected from the group consisting of alkyl groups containing 1 to 4 carbon atoms, alkoxy groups containing 1 to 4 carbon atoms, chlorine and bromine; m is an integer of 2 to 5, and the cyanate group is always directly bonded to the aromatic nucleus.

Examples of the polyfunctional cyanate ester include dicyanatobenzene; 1,3,5-tricyanatobenzene; 1,3-, 1,4-, 1,6-, 1,8-, 2,6- or 2,7-dicyanatonaphthalene; 1,3,6-tricyanatonaphthalene; 4,4'-dicyanatobiphenyl; bis(4-cyanatophenyl)methane; 2,2-bis(4-cyanatophenyl)propane, 2,2-bis(3,5-dichloro-4-cyanatophenyl)propane, 2,2-bis(3,5-diblomo-4-dicyanatophenyl)propane; bis(4-cyanatophenyl)ether; bis(4-cyanatophenyl)thioether; bis(4-cyanatophenyl)sulfone; tris(4-cyanatophenyl)phosphite; tris(4-cyanatophenyl)phosphate; bis(3-chloro-4-cyanatophenyl)methane; cyanated novolak derived from novolak cyanated bisphenol type polycarbonate oligomer derived from bisphenol type polycarbonate oligomer and mixture thereof. Other cyanate esters employed in the practice of this invention are given in Japanese Patent Publication Nos. 1928/1966, 4791/1969, 11712/1970 and 41112/1971 and Japanese Patent Publication (laid open) No. 63149/1976 which are incorporated herein by references. The above-mentioned cyanate esters may be used as mixtures.

Prepolymers may be used containing a sym-triazine ring which is prepared by the trimerization of the cyanate groups of the cyanate ester, and which have an average molecular weight of at least 400 but no more than 6,000. Such prepolymers can be prepared by polymerizing the above cyanate esters in the presence of, as a catalyst, an acid such as a mineral acid or a Lewis acid, a base such as sodium hydroxide, a sodium alcoholate or a tertiary amine, or a slat such as sodium carbonate or lithium chloride.

The polyfunctional cyanate ester can be used in the form of a mixture of the monomer and the prepolymer. For example, many of the commercially available cyanate esters derived from bisphenol A and cyanogen halide are in the form of mixtures of cyanate monomers and prepolymers, and such materials can also be used in the present invention.

A coprepolymer of the cyanate ester and an amine may be used as the cyanate ester component. Examples of the amines include meta- or para-phenylenediamine, meta- or para-xylylenediamine, 1,4- or 1,3-cyclohexanediamine, hexahydroxylylenediamine, 4,4-diaminobiphenyl, bis(4-aminophenyl)methane, bis(4-aminophenyl)ether, bis(4-aminophenyl)sulfone, bis(4-amino-3-methylphenyl)methane, bis(3-chloro-4-aminophenyl)methane, bis(4-amino-3,5-dimethylphenyl)methane, bis(4-aminophenyl)cyclohexane, 2,2-bis(4-aminophenyl)propane, 2,2-bis(4-amino-3-methylphenyl)propane, 2,2-bis(3,5-dibromo-4-aminophenyl)propane, bis(4-aminophenyl)phenylmethane, 3,4-diaminophenyl-4'-aminophenylmethane and 1,1-bis(4-aminophenyl)-1-phenylethane.

A mixture of prepolymer of the cyanate ester and coprepolymer of the cyanate ester and an amine may be used as component (a) of this invention.

Compounds which can be employed as component (b) of this invention are those having two or more acrylic ester groups and are represented by the formula

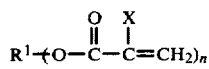

wherein $R^1$ is organic group comprising as member constituting a main chain or ring C and optionally O and/or N and as a pendant hydroxy and/or halogen, when $R^1$ contains aromatic group, $R^1$ has 6–35 carbon atoms, and when $R^1$ contains no benzene ring, $R^1$ has 1–15 carbon atoms, X is hydrogen or methyl, n is integer of 2,3,4,5 or 6 and valency of $R^1$ is the same as n. In general, a cured resin obtained by employing an acrylic compound having a long chain has poor heat resistance. Therefore, when $R^1$ contains no benzene ring in the above formula, it is critical that $R^1$ have 1–15 carbon atoms, whereas when $R^1$ contains aromatic group in the above formula, it is critical that $R^1$ have 6–35 carbon atoms. Preferably, the compound having two or more acrylic ester groups is selected from the group consisting of (i) compounds represented by the formula

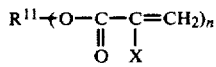

wherein $R^{11}$ is aliphatic hydrocarbon having 1–15 carbon atoms, or hydroxy or halogen-substituted hydrocarbon having 1–15 carbon atoms, X and n are defined above and valency of $R^{11}$ is the same as n;

(ii) compounds represented by the formula

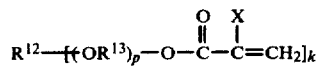

wherein $R^{12}$ is aliphatic hydrocarbon or hydroxy or halogen-substituted hydrocarbon, $R^{13}$ is alkylene or hydroxy or halogen-substituted alkylene, $R^{12}$, $R^{13}$, p and k are selected so that (the number of carbon atoms of $R^{12}$)+(the number of carbon atoms of $R^{13}$)×(p)×(k) is 15 or less, X is as defined above and valency of $R^{12}$ is the same as k, and k is 2,3,4,5 or 6.

(iii) compounds represented by the formula

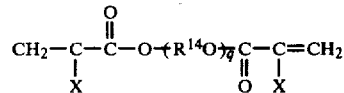

wherein $R^{14}$ is alkylene, or hydroxy or halogen-substituted alkylene, $R^{14}$ and q are selected so that (the number of carbon atoms of $R^{14}$)×(q) is 15 or less, X is as defined above:

(iv) compounds represented by the formula

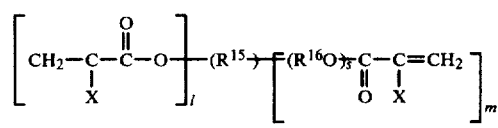

wherein $R^{15}$ is aliphatic hydrocarbon or hydroxy or halogen-substituted hydrocarbon, $R^{16}$ is alkylene or hydroxy or halogen-substituted alkylene, l+m is 2,3,4,5 or 6, (the number of carbon atoms of $R^{15}$)+(the number of carbon atoms of $R^{16}$)×(s)×(m) is 15 or less, X is as defined above, and valency of $R^{15}$ is the same as l+m, and each of l and m is at least one, (v) compounds represented by the formula

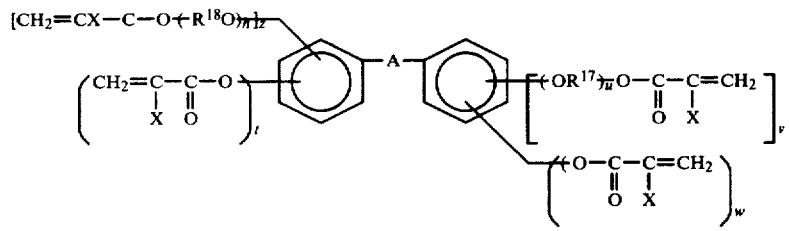

wherein $R^{17}$ and $R^{18}$ are the same or different, and independently alkylene having 2–3 carbon atoms, or hydroxy or halogen-substituted alkylene having 2–3 carbon atoms, A is —O—, —CH$_2$—, —C$_2$H$_4$—, or —C$_3$H$_6$—, t and w are independently 0 or 1, v and z are independently 1 or 2, and u and h are independently 0 or integer 1–7, and X is as defined above, (vi) compounds represented by the formula

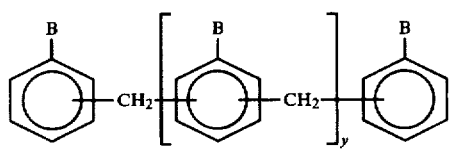

wherein y is 1, 2, or 3 and at least two of B groups on the benzene rings are

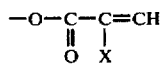

wherein X is as defined above and the remainder of B groups are hydroxy and (vii) compound represented by the formula

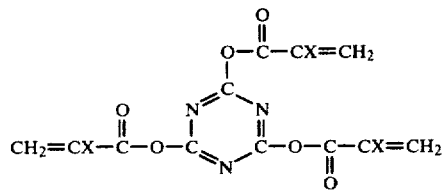

wherein X is as defined above.

Typical Examples of the compounds having two or more acrylic ester groups include ethylene glycol dimethacrylate or diacrylates, diethylene glycol dimethacrylate or diacrylate, triethylene glycol dimethacrylate or diacrylate, polyethylene glycol dimethacrylate or diacrylate, 1,3-butylene glycol dimethacrylate or diacrylate, 1,4-butylene glycol dimethacrylate or diacrylate, neopentyl glycol dimethacrylate or acrylate, dipropylene glycol dimethacrylate or diacrylate, polypropylene glycol dimethacrylate or diacrylate, 2,2'-bis(4-methacryloxydiethoxyphenyl)propane, 2,2'-bis(4-acryloxydiethoxyphenyl)propane, 2,2'-bis(4-acryloxydiethoxyphenyl)propane, propylene glycol diacrylate or dimethacrylate, 1,3-propanediol diacrylate or dimethacrylate, 1,4-butanediol diacrylate or dimethacrylate, 1,5-pentanediol diacrylate or dimethacrylate, 1,6-hexanediol diacrylate or dimethacrylate, 1,1,1-trimethylol propane triacrylate or trimethacrylate, 1,1,1-trimethylol ethane trimethacrylate or triacrylate, tetramethylol methane triactylate or trimethacrylate, tetramethylol methane tetracrylate or tetramethacrylate, dibromoneopentyl glycol dimethacrylate or diacrylate, glycerin triacrylate or trimethacrylate, pentaerythritol diacrylate or dimethacrylate, pentaerythritol triacrylate or trimethacrylate, pentaerythritol tetracrylate or tetramethacrylate, sorbitol tetracrylate or tetramethacrylate, sorbitol hexacrylate or hexamethacrylate, sorbitol pentacrylate or pentamethacrylate, 1,4-hexanediol diacrylate or dimethacrylate, 2,2-bis(acryloyloxycyclohexyl)propane, 2,2-bis(methacryloyloxycyclohexyl)propane, tetraethylene glycol diacrylate or dimethacrylate, 2,2-bis(4-acryloxyphenyl)propane, 2,2-bis(4-methacryloxyphenyl)propane, 2,2-bis[4-(2-acryloxy-ethoxy)phenyl]propane, 2,2-bis[4-(2-methacryloxy-ethoxy)phenyl]propane, 2,2-bis[4-(acryloxy-di-(ethyleneoxy)phenyl)]propane, 2,2-bis[4-(methacryloxy-di-(ethyleneoxy)phenyl)]propane, 2,2-bis[4-(acryloxy-poly-(ethyleneoxy)phenyl)]propane, 2,2-bis[4-(methacyloxy-poly-(ethyleneoxy)phenyl)]propane, polyvalent acrylate or methacrylate of phenol resin procondensate, such as biphenol A type epoxy resin, novolak type epoxy resin, alicyclic epoxy resin, diglycidyl ester of phthalic acid, epoxypolyacrylates or epoxypolymethacrylate obtained by reacting bisphenol A type epoxy resin and acrylic acid or methacrylic acid, polyester polyacrylates or polymethacrylate obtained by reacting polyester having two or more hydroxy groups at its end position with acrylic acid or methacrylic acid, 2,2-dibromomethyl-1,3-propanediol diacrylate or dimethacrylate, and mixtures thereof.

Prepolymers of the above compounds obtained by prepolymerizing the above compound having two or more acrylic ester groups by means of an organic peroxide, ultraviolet or heat may be employed as component (b).

The ratio of component (a) and component (b) is not critical. The ratio by weight of component (a) to component (b) may be in the range of from 99:1 to 1:99, preferably from 95:5 to 5:95. For example, when it is necessary for a cured resin to have heat resistance, more component (a) is used than component (b).

When component (c) is used with components (a) and (b), the heat resistance of the cured resin is further improved.

The polyfunctional maleimides employed in the present invention are organic compounds having two or more maleimide groups derived from maleic anhydride and a polyamine and are represented by the following general formula

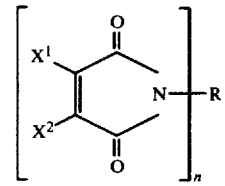

wherein R represents divalent to pentavalent aromatic or alicyclic organic group, each of $X^1$ and $X^2$ represent a hydrogen atom, halogen atom or alkyl group, and n represent integer of 2–5.

The maleimides represented by the above formula can be produced by a method known per se which involves reacting maleic anhydride with polyamine to form a maleamide acid, and then dehydro-cyclizing the maleamide acid.

Aromatic amines are preferable as the starting polyamines. The reason is that the resulting object resin has excellent properties, such as heat-resistance, etc. When the resulting object resins have desirable flexibility and pliability, alicyclic amine alone or combination of the alicyclic amines and other amines may be used. Though secondary amines can be used as the starting amine, the primary amines are preferable.

Amines employed in reaction with cyanate esters for preparing coprepolymers of the cyanate ester and the amine may be profitably used as an amine component for preparing maleimides. In addition to the above-mentioned amines, melamine having s-triazine ring and polyamines obtained by reaction aniline with formaldehyde, in which two or more benzene rings are bonded through methylene bond, may also be used.

The functional maleimides as mentioned above may be used alone or as a mixture. Also the prepolymer of the maleimide obtained by heating the maleimide in the presence or absence of a catalyst may be used. In addition, coprepolymers of the maleimide and the amide employed for synthesizing the polyfunctional maleimide may be used.

The ratio of component (a) and component (c) is not critical. In general, the ratio by weight component (a) and component (c) may be in the range of from 99:1 to 40:60.

The curable composition of this invention may be prepared by merely mixing the above-mentioned components (a) and (b) or components (a), (b) and (c) or by using the product of preliminary reaction of these components.

The curable composition of this invention comprises a mixture and/or a preliminary reaction product of (a) at least one compound selected from the group consisting of polyfunctional cyanate esters, prepolymers of the cyanates esters or coprepolymers of the cyanate esters and an amine and (b) a compound having two or more acrylic ester groups (c) at least one compound selected from the group consisting of polyfunctional maleimides, prepolymers of the maleimides and coprepolymers of the maleimides and an amine and/or (d) other component. The composition may be a mixture of components (a) and (b) and optionally (c) and/or (d); a preliminary reaction product of components (a) and (b), components (a), (b) and (c) or components (a), (b), (c) and (d); a mixture of preliminary reaction product of two or three of components (a), (b), (c) and (d) and the remainder thereof. Other components (d) include epoxy resins; (meth)acrylates, such as methacrylates, acrylates, methacrylic epoxy esters, acrylic epoxy esters, methacrylic alkenyl esters, acrylic alkenyl esters, its prepolymers; polyallyl compounds, such as diallyl phthalate, divinylbenzene, diallylbenzene, trialkenyl isocyanulates or its prepolymers; phenol resins; polyvinyl acetal resins, such as polyvinyl formal, polyvinyl acetal, or polyvinyl butyral; acrylic resins, silicone resins, or alkyd resins having OH group or COOH group; and liquid or elastic rubbers, such as polybutadiene, butadiene-acrylonitrile copolymer, polychloroprene, butadiene-styrene copolymer, polyisoprene, natural rubbers polyester imide resins, polyamide imide resins, polyisocyanate resins, polyimide resin or polyhydantoin resins.

The curable composition of this invention may be reticulated by heating it alone to form a cured resin having heat resistance. In general, a catalyst may be used in order to promote crosslinking reaction of the components in the composition.

Examples of the catalysts include imidazoles, such as 2-methylimidazole, 2-undecylimidazole, 2-heptadecyl imidazole, 2-phenylimidazole, 2-ethyl-4-methylimidazole, 1-benzyl-2-methylimidazole, 1-propyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-guanaminoethyl-2-methylimidazole and addition product of an imidazole and trimellitic acid; tertiary amines, such as N,N-dimethyl benzylamine, N,N-dimethylaniline, N,N-dimethyltoluidine, N,N-dimethyl-p-anisidine, p-halogeno-N,N-dimethylaniline, 2-N-ethylanilino ethanol, tri-n-butylamine, pyridine, quinoline, N-methyl-morpholine, triethanolamine, triethylenediamine, N,N,N',N'-tetramethylbutanediamine, N-methylpiperidine; phenols, such as phenol, cresol, xylenol, resorcine, and phloroglucin; organic metal salts, such as lead naphthenate, lead stearate, zinc naphthenate, zinc octoate, tin oleate, dibutyl tin maleate, manganese naphthenate, cobalt naphthenate, and acetyl acetone iron; and inorganic metal salts, such as stannic chloride, zinc chloride and aluminum chloride; peroxides, such as benzoyl peroxide, lauroyl peroxide, octanoyl peroxide, acetyl peroxide, para-chlorobenzoyl peroxide and di-t-butyl diperphthalate; acid anhydrides, such as maleic anhydride, phthalic anhydride, lauric anhydride, pyromellitic anhydride, trimellitic anhydride, hexahydrophthalic anhydride, hexahydropyromellitic anhydride and hexahydrotrimellitic anhydride; azo compounds, such as azoisobutylonitrile, 2,2'-azobispropane, m,m'-azoxystyrene, hydrozones, and mixtures thereof.

In addition to the above-mentioned catalyst, a curing agent for epoxy resin and a curing catalyst for epoxy resin may be used as a catalyst of this invention.

The amount of the catalyst employed may be less than 5% by weight of total composition.

A variety of additives may be added to the curable composition to impact specific properties provided that they do not impair the essential properties of the resulting resin. Examples of the additives include natural or synthetic resins, fibrous reinforcement, fillers, pigments, dyestuffs, thickening agents, lubricants, flame-retardants and the like.

The curable compositions of this invention are present in a wide range of forms from liquid to solid at room temperature, depending on the natures of the components constituting the composition, and the preliminary reaction conditions. Solid curable composition, liquid curable composition or solution of the composition in solvent may be used according to the use purpose.

The curing conditions of the curable composition of this invention depend on proportion of components constituting the composition and the nature of the components employed. In general, the composition of this invention may be cured by heating it at a temperature within the range of 100°-250° C.

When the curable composition of this invention is used for preparing molding, laminate, adhesive-assembly, press means is preferably applied to the molding, laminate or adhesive-assemly in the heat curing step. In general, these products may be pressed at a superpressure of 1–500 Kg/cm$^2$.

The composition of this invention is rapidly curable and is cured even under mild conditions, so is especially suitable when quantity production and ease of warkability are desired. The cured resin made from the composition not only has excellent adhesive force, bond strength, heat resistance, and electric properties, but also is excellent in mechanical properties, such as impact resistance, chemical resistance, moisture resistance and the like. The composition of this invention has a variety of uses as a coating material for rust prevention, flame resistance, flame retardance and the like; as electrical insulating varnish; as adhesive; in laminates to be used for furnitures, building materials, sheathing materials, electrical insulating materials, and the like; and in a variety of moldings.

The present invention is further illustrated by the following non-limiting Examples and Controls. Percent and parts are by weight, unless otherwise specified.

EXAMPLE 1

2,2-Bis(4-cyanatophenyl)propane (600 g) was preliminarily polymerized at 150° C. for 420 minutes to obtain prepolymer. Zinc octoate (0.3 g) was added to the prepolymer. 2,2-Bis(4-methacryloyl phenyl)propane (400 g) which is commercially available from AKZO Chemie BV as Diacrl 101 was preliminarily polymerized by means of benzoly peroxide (1 g) at 100° C. for 40 minutes to obtain prepolymer thereof. The two prepolymers were blended, cast and cured at 160° C. for 100 minutes and further at 175° C. for 120 minutes to obtain good cast article.

The properties of the article are shown in Table 1.

Control 1

Prepolymer of 2,2-bis(4-cyanatophenyl)propane obtained in Example 1 was cast and cured in the same way as in Example 1. The properties of the resulting cast article are shown in Table 1.

EXAMPLE 2

Bis(4-cyanatophenyl)ether (900 g) and bis(4-maleimidephenyl)ether (100 g) were preliminarily reacted at 150° C. for 150 minutes. To the resulting prepolymer was added 200 g of prepolymer of 2,2-bis(4-methacryloyl pehnyl)propane. The mixture was blended uniformly, cast and cured in the same way as in Example 1. The properties of the resulting cast article are shown in Table 1.

TABLE 1

| | | Example 1 | Example 2 | Control 1 |
|---|---|---|---|---|
| glass transition point (°C.) | | 232 | 257 | 249 |
| flexural strength | 25° C. | 11 | 12 | 9 |
| Kg/mm² | 200° C. | 7 | 9 | 7 |
| chemical resistance (immersion for 24 hours) | acetone MEK DMF benzine trichlene chloroform | no change | no change | no change |
| water absorption (%) | | 0.2 | 0.4 | 0.5 |
| moisture resistance (at 120° C. at 2 atm for 100 hrs.) | | no change | no change | changed slightly |
| dielectric constant (1 MHz) | | 2.82 | 2.99 | 3.10 |

EXAMPLE 3

1,4-Dicyanatobenzene (700 g), bis(4-maleimidephenyl)methane (240 g) and mixture (60 g) of 4-maleimidephenyl-3',4'-dimaleimidephenylmethane and 4-maleimidephenyl-2',4'-dimaleimidephenylmethane were preliminarily reacted at 150° C. for 100 minutes to obtain prepolymer thereof. The prepolymer was dissolved in mixed solvent of methyl ethyl ketone and N,N-dimethylformamide. To the solution were added 100 g of prepolymer of 2,2-bis(4-methacryloyl phenyl)-propane of example 1, 0.4 g of zinc octoate, 0.3 g of triethylene diamine, 0.2 g of dicumyl peroxide and 160 g of novolak type epoxy resin (ECN-1273, produced by Ciba Geigy). The mixture was blended uniformly. Glass cloth was impregnated with the solution and heated to form the B-stage prepreg. Eight prepregs were stacked and sandwiched between two electrolytic copper foils with 35 micro thickness. The laminate was press-molded at 35 Kg/cm² at 170° C. for 3 hrs. and further at 50 Kg/cm² at 195° C. for 25 hrs to obtain good plate. The properties of the plate are shown in Table 2.

Control 2

1000 g of 1,4-dicyanatobenzene was preliminarily polymerized at 150° C. for 150 minutes. The resulting prepolymer was dissolved in methyl ethyl ketone. To the solution were added 0.3 g of zinc octoate and 0.3 g of triethylenediamine. Glass cloth was impregnated with the solution and heated to form B-stage prepreg. Eight prepregs were stacked and sandwiched between two electrolytic copper foils with 35μ thickness. The laminate was press-molded at 40 Kg/cm² at 175° C. for 140 minutes. The properties of the plate are shown in Table 2.

TABLE 2

| | | Example 3 | Control 2 |
|---|---|---|---|
| peel strength of copper foil (Kg/cm) | | 1.80 | 1.65 |
| flexural strength (Kg/mcm²) | 25° C. | 72 | 65 |
| | 250° C. | 47 | 45 |
| glass transition temperature (°C.) | | 283 | 220 |
| moisture resistance (120° C. 2 atm 40 hrs.) | | no change | considerably changed |
| dielectric constant (1 MHz) | | 4.0 | 4.1 |
| water absorption (%) | | 0.1 | 0.3 |

What is claimed is:
1. A curable resin composition comprising:
   (a) at least one cyanate ester compound selected from the group consisting of:
   (1) a polyfunctional aromatic cyanate ester monomer having the formula:

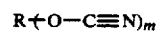

$$R\text{+}O-C\equiv N)_m$$

wherein m is 2 to 5 and R is an aromatic organic group, the cyanate groups being bonded to an aromatic ring of said aromatic organic group,
   (2) a homoprepolymer of one or more cyanate esters of (1), and
   (3) a coprepolymer of (1) and an amine; and
   (b) at least one compound having two or more acrylic ester groups selected from the group consisting of:
   (i) compounds represented by the formula

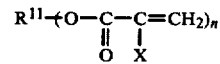

$$R^{11}\text{+}O-\underset{\underset{O}{\|}}{C}-\underset{\underset{X}{|}}{C}=CH_2)_n$$

wherein R¹¹ is aliphatic hydrocarbon having 1–15 carbon atoms, or hydroxy or halogen-substituted hydrocarbon having 1–15 carbon atoms, X is hydrogen or methyl, and n is an integer and is 2, 3, 4, 5 or 6, and the valency of R¹¹ is the same as n;
   (ii) compounds represented by the formula

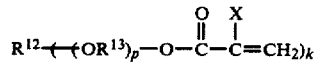

$$R^{12}\text{+}(OR^{13})_p-O-\underset{\underset{O}{\|}}{C}-\underset{\underset{X}{|}}{C}=CH_2)_k$$

wherein R¹² is aliphatic hydrocarbon or hydroxy or halogen-substituted hydrocarbon, R¹³ is alkylene or hydroxy or halogen-substituted alkylene, R¹², R¹³, p and k are selected so that (the number of carbon atoms of R¹²)+(the number of carbon atoms of R¹³)×(p)×(k) is 15 or less, X is as defined above and the valency of R¹² is the same as k, and k is 2, 3, 4, 5 or 6;
   (iii) compounds represented by the formula

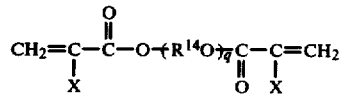

$$CH_2=\underset{\underset{X}{|}}{C}-\underset{\underset{O}{\|}}{C}-O\text{+}R^{14}O\text{)}_q\underset{\underset{O}{\|}}{C}-\underset{\underset{X}{|}}{C}=CH_2$$

wherein R¹⁴ is alkylene, or hydroxy or halogen-substituted alkylene, R¹⁴ and q are selected so that (the number of carbon atoms of R¹⁴)×(q) is 15 or less, X is as defined above;

(iv) compounds represented by the formula

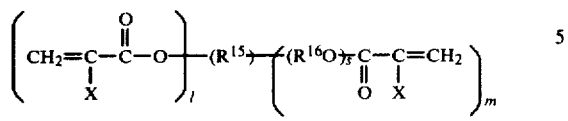

wherein $R^{15}$ is aliphatic hydrocarbon or hydroxy or halogen-substituted hydrocarbon, $R^{16}$ is alkylene or hydroxy or halogen-substituted alkylene, $l+m$ is 2, 3, 4, 5 or 6, (the number of carbon atoms of $R^{15}$)+(the number of carbon atoms of $R^{16}$)×(s)×(m) is 15 or less, X is as defined above, and the valency of $R^{15}$ is the same as $l+m$;

(v) compounds represented by the formula

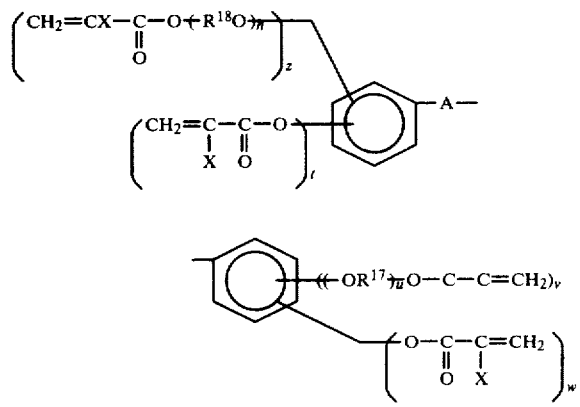

wherein $R^{17}$ and $R^{18}$ are the same or different, and independently alkylene having 2-3 carbon atoms, or hydroxy or halogen-substituted alkylene having 2-3 carbon atoms, A is —O—, —CH$_2$—, —C$_2$H$_4$—, or —C$_3$H$_6$—, t and w are independently 0 or 1, v and z are independently 1 or 2, and u and h are independently 0 or integer 1-7, and X is as defined above, (vi) compounds represented by the formula

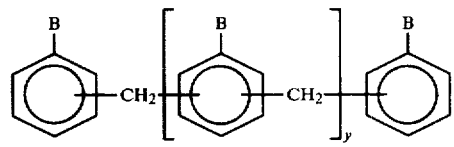

wherein y is 1, 2, or 3 and at least two of B groups on the benzene rings are

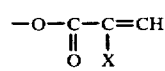

wherein X is as defined above and the remainder of B groups are hydroxy;

(vii) compounds represented by the formula

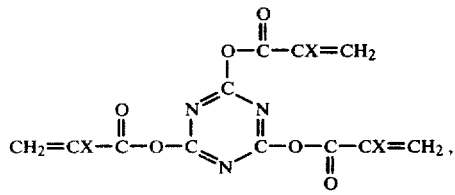

wherein X is as defined above, and mixtures thereof; said composition including a mixture of components (a) and (b), a preliminary reaction product of components (a) and (b), or the combination of said mixture and said preliminary reaction product.

2. The composition as defined in claim 1 wherein the cyanate ester is selected from the group consisting of 1,3-, 1,4-dicyanatobenzene; 1,3,5-tricyanatobenzene, 1,3-, 1,4-, 1,6-, 1,8-, 2,6- or 2,7-dicyanatonaphthalene; 1,3,6-tricyanatonaphthalene; 4,4'-dicyanatobiphenyl; bis(4-tricyanatonaphthalene; 4,4'-dicyanatobiphenyl; bis(4-cyanatophenyl)methane; 2,2-bis(4-cyanatophenyl)propane; 2,2-bis(3,5-dichloro-4-cyanatophenyl)propane; 2,2-bis(3,5-dibromo-4-dicyanatophenyl)propane; bis(4-cyanatophenyl)ether; bis(4-cyanatophenyl)thioether; bis(4-cyanatophenyl)sulfone; tris(4-cyanatophenyl)phosphite; tris(4-cyanatophenyl)phosphate; bis(3-chloro-4-cyanatophenyl)methane; cyanated novolak produced by reacting a novolak with cyanogen halide; cyanated bisphenol polycarbonate oligomer produced by reacting a bisphenol polycarbonate oligomer with cyanogen halide; and mixtures thereof.

3. The composition as defined in claim 1 wherein the compound having two or more acrylic ester groups is selected from the group consisting of compounds (i), (iii), (iv) and (v).

4. The composition as defined in claim 1 wherein the compound is selected from compounds (v).

5. The composition as defined in claim 1 wherein the ratio by weight of component (a) to component (b) is in the range of from 99:1 to 1:99.

6. A curable resin composition comprising:
(a) at least one cyanate ester compound selected from the group consisting of:
(1) a polyfunctional aromatic cyanate ester monomer having the formula:

wherein m is 2 to 5 and R is an aromatic organic group, the cyanate groups being bonded to an aromatic ring of said aromatic organic group,
(2) a homoprepolymer of one or more cyanate esters of (1), and
(3) a coprepolymer of (1) and an amine;
(b) at least one compound having two or more acrylic ester groups represented by the formula selected from the group consisting of:
(i) compounds represented by the formula

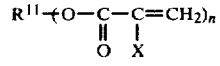

wherein $R^{11}$ is aliphatic hydrocarbon having 1-15 carbon atoms, or hydroxy or halogen-substituted hydrocarbon having 1-15 carbon atoms, X is hydrogen or methyl, and n is an integer and is 2, 3, 4, 5 or 6, and the valency of $R^{11}$ is the same as n;

(ii) compounds represented by the formula

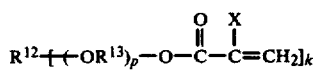

wherein $R^{12}$ is aliphatic hydrocarbon or hydroxy or halogen-substituted hydrocarbon, $R^{13}$ is alkylene or hydroxy or halogen-substituted alkylene, $R^{12}$, $R^{13}$, p and k are selected so that (the number of carbon atoms of $R^{12}$)+(the number of carbon atoms of $R^{13}$)×(p)×(k) is 15 or less, X is as defined above and the valency of $R^{12}$ is the same as k, and k is 2, 3, 4, 5 or 6;

(iii) compounds represented by the formula

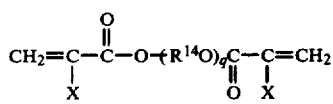

wherein $R^{14}$ is alkylene, or hydroxy or halogen-substituted alkylene, $R^{14}$ and q are selected so that (the number of carbon atoms of $R^{14}$)×(q) is 15 or less, X is as defined above;

(iv) compounds represented by the formula

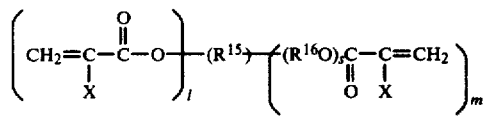

wherein $R^{15}$ is aliphatic hydrocarbon or hydroxy or halogen-substituted hydrocarbon, $R^{16}$ is alkylene or hydroxy or halogen-substituted alkylene, l+m is 2, 3, 4, 5 or 6, (the number of carbon atoms of $R^{15}$)+(the number of carbon atoms of $R^{16}$)×(s)×(m) is 15 or less, X is as defined above, and the valency of $R^{15}$ is the same as l+m;

(v) compounds represented by the formula

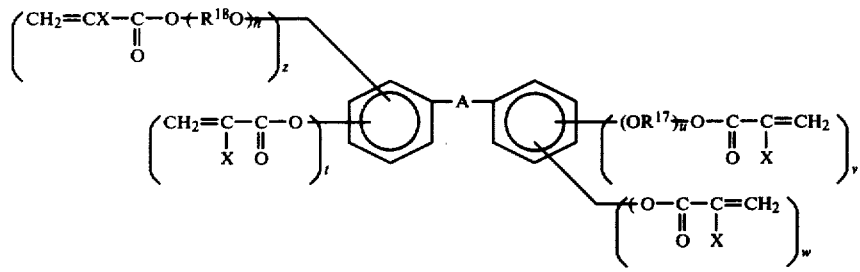

wherein $R^{17}$ and $R^{18}$ are the same or different, and independently alkylene having 2-3 carbon atoms, or hydroxy or halogen-substituted alkylene having 2-3 carbon atoms, A is —O—, —CH$_2$—, —C$_2$H$_4$—, or —C$_3$H$_6$—, t and w are independently 0 or 1, v and z are independently 1 or 2, and u and h are independently 0 or integer 1-7, and X is as defined above;

(vi) compounds represented by the formula

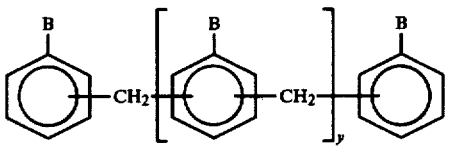

wherein y is 1, 2, or 3 and at least two of B groups on the benzene rings are

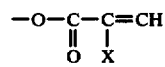

wherein X is as defined above and the remainder of B groups are hydroxy;

(vii) compounds represented by the formula

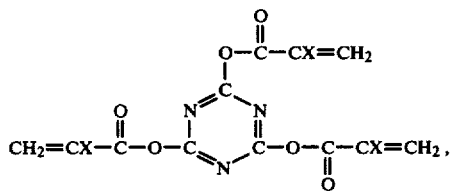

wherein X is as defined above, and mixtures thereof;

(c) at least one compound selected from the group consisting of:
(1) a polyfunctional maleimide,
(2) a homoprepolymer of one or more maleimides of (1), and
(3) a coprepolymer of (1) and an amine, said composition including a mixture of components (a), (b) and (c), a preliminary reaction product of components (a), (b) and (c), the combination of said mixture and said preliminary reaction product, the combination of (a) and the preliminary reaction product of (b) and (c), the combination of (b) and the preliminary reaction product of (a) and (c), or the combination of (c) and the preliminary reaction product of (a) and (b).

7. The composition as defined in claim 6 wherein the cyanate ester is selected from the group consisting of 1,3-, 1,4-dicyanatobenzene; 1,3,5-tricyanatobenzene; 1,3-, 1,4-, 1,6-, 1,8-, 2,6- or 2,7-dicyanatonaphthalene; 1,3,6-tricyanatonaphthalene; 4,4'-dicyanatobiphenyl; bis(4-cyanatophenyl)methane; 2,2-bis(4-cyanatophenyl)propane; 2,2-bis(3,5-dichloro-4-cyanatophenyl)propane; 2,2-bis(3,5-dibromo-4-dicyanatophenyl)propane; bis(4-cyanatophenyl)ether; bis(4-cyanatophenyl)- thioether; bis(4-cyanatophenyl)sulfone; tris(4-cyanatophenyl)phosphite; tris(4-cyanatophenyl)phosphate; bis(3-chloro-4-cyanatophenyl)methane; cyanated novolak produced by reacting a novolak with cyanogen halide; cyanated bisphenol polycarbonate oligomer produced by reacting a bisphenol polycarbonate oligomer with cyanogen halide; and mixtures thereof.

8. The composition as defined in claim 6 wherein the compound having two or more acrylic ester groups is selected from the group consisting of compounds (i), (iii), (iv) and (v).

9. The composition as defined in claim 6 wherein the compound is selected from compounds (v).

10. The composition as defined in claim 6 wherein the ratio by weight of component (a) to component (b) is in the range of from 99:1 to 1:99.

* * * * *